(12) United States Patent
Schütz

(10) Patent No.: US 9,744,919 B2
(45) Date of Patent: Aug. 29, 2017

(54) REAR TRIM STRIP FOR A MOTOR VEHICLE, AND A METHOD FOR THE PRODUCTION OF A REAR TRIM STRIP

(75) Inventor: Heiko Schütz, Velbert (DE)

(73) Assignee: HUF HUELSBECK & FUERST GMBH & CO. KG, Velbert (DE)

( * ) Notice: Subject to any disclaimer, the term of this patent is extended or adjusted under 35 U.S.C. 154(b) by 743 days.

(21) Appl. No.: 13/602,379

(22) Filed: Sep. 4, 2012

(65) Prior Publication Data

US 2013/0058120 A1 Mar. 7, 2013

(30) Foreign Application Priority Data

Sep. 2, 2011 (DE) .................. 10 2011 053 236

(51) Int. Cl.
  *B60Q 1/56* (2006.01)
  *H05K 13/04* (2006.01)
  *B60R 13/04* (2006.01)
  *B60Q 1/26* (2006.01)
  *B60R 11/04* (2006.01)
  *E05B 81/76* (2014.01)

(52) U.S. Cl.
  CPC ............ *B60R 13/04* (2013.01); *B60Q 1/2669* (2013.01); *B60Q 1/56* (2013.01); *B60R 11/04* (2013.01); *E05B 81/76* (2013.01); *Y10T 29/49002* (2015.01)

(58) Field of Classification Search
  CPC ........ B60Q 1/323; B60Q 3/0216; B60Q 1/56; B60Q 1/2669; E05B 81/76; B60R 11/04
  USPC ......................................................... 362/496
  See application file for complete search history.

(56) References Cited

U.S. PATENT DOCUMENTS

| 4,206,927 A | * | 6/1980 | Garascia ................ F16J 15/104 |
| | | | 277/654 |
| 5,368,903 A | * | 11/1994 | Trier ....................... B60R 13/04 |
| | | | 293/128 |
| 5,952,731 A | * | 9/1999 | McPherson .......... G07C 9/0069 |
| | | | 180/287 |
| 6,256,932 B1 | * | 7/2001 | Jyawook ................. E05B 77/24 |
| | | | 292/336.3 |
| 6,601,978 B2 | * | 8/2003 | Andrea .................. B62D 25/12 |
| | | | 362/155 |

(Continued)

FOREIGN PATENT DOCUMENTS

GB 2384104 A 7/2003

*Primary Examiner* — Andrew Coughlin
*Assistant Examiner* — Colin Cattanach
(74) *Attorney, Agent, or Firm* — Joyce von Natzmer; Agris & von Natzmer LLP

(57) ABSTRACT

The invention relates to a rear trim strip for a motor vehicle, having at least one base support and at least one luminous body which is arranged on an opening of the base support in order to illuminate the outer area of the motor vehicle, having an actuating element arranged on the base support, wherein a switch can be actuated by means of said actuating element, whereby it is possible to activate a lock on the motor vehicle, such that a lid is attached on the base support, the lid is designed having an electronics board which projects into the base support, wherein an electronic device, including the switch, is arranged on said electronics board, and the lid is designed in such a manner that a reliable transmission of force takes place through the electronics board when the actuating element is actuated.

13 Claims, 5 Drawing Sheets

(56) References Cited

U.S. PATENT DOCUMENTS

| | | | | |
|---|---|---|---|---|
| 6,872,345 B1* | 3/2005 | Yustick | B29C 45/1657 | 264/250 |
| 7,168,829 B2* | 1/2007 | Nagase | B60Q 1/2661 | 362/485 |
| 7,195,381 B2* | 3/2007 | Lynam | B60K 35/00 | 362/294 |
| 7,273,991 B2* | 9/2007 | Korultay et al. | | 200/61.62 |
| 7,289,037 B2* | 10/2007 | Uken et al. | | 340/815.4 |
| 7,400,232 B2* | 7/2008 | Reichling | B60R 25/1001 | 16/110.1 |
| 7,777,141 B2* | 8/2010 | Ishiguro | E05B 83/16 | 200/302.2 |
| 2003/0031025 A1* | 2/2003 | Huizenga | B60Q 1/2669 | 362/501 |
| 2003/0168881 A1* | 9/2003 | Lesueur | B60J 5/101 | 296/138 |
| 2004/0010951 A1* | 1/2004 | Bincoletto | B60Q 1/56 | 40/204 |
| 2004/0061348 A1* | 4/2004 | Takeda | B60R 13/04 | 296/1.08 |
| 2004/0076014 A1* | 4/2004 | Bach et al. | | 362/501 |
| 2004/0124659 A1* | 7/2004 | Vaitus | B60J 5/101 | 296/106 |
| 2004/0174042 A1* | 9/2004 | Izabel | B60J 5/101 | 296/146.8 |
| 2005/0115810 A1* | 6/2005 | Spies | E05B 81/76 | 200/61.62 |
| 2005/0194805 A1* | 9/2005 | Gates | B60Q 1/56 | 296/1.07 |
| 2006/0037850 A1* | 2/2006 | Miyake | E05B 81/76 | 200/341 |
| 2006/0163048 A1* | 7/2006 | Searle | H01H 1/5866 | 200/302.1 |
| 2006/0176710 A1* | 8/2006 | Meinke | B60Q 1/2669 | 362/503 |
| 2006/0279095 A1* | 12/2006 | Ishiguro | E05B 81/76 | 292/336.3 |
| 2007/0085361 A1* | 4/2007 | Hauser | B60R 13/04 | 296/1.08 |
| 2008/0019007 A1* | 1/2008 | Kulas et al. | | 359/604 |
| 2009/0047890 A1* | 2/2009 | Yano | B65D 77/225 | 454/143 |
| 2009/0129112 A1* | 5/2009 | Shamitz | B60Q 1/56 | 362/549 |
| 2009/0257241 A1* | 10/2009 | Meinke | B60Q 1/2669 | 362/546 |
| 2010/0219935 A1* | 9/2010 | Bingle | E05B 81/76 | 340/5.54 |
| 2011/0013408 A1* | 1/2011 | Goto | B60Q 1/2669 | 362/459 |
| 2011/0058386 A1* | 3/2011 | Penna | B60Q 1/2669 | 362/544 |

\* cited by examiner

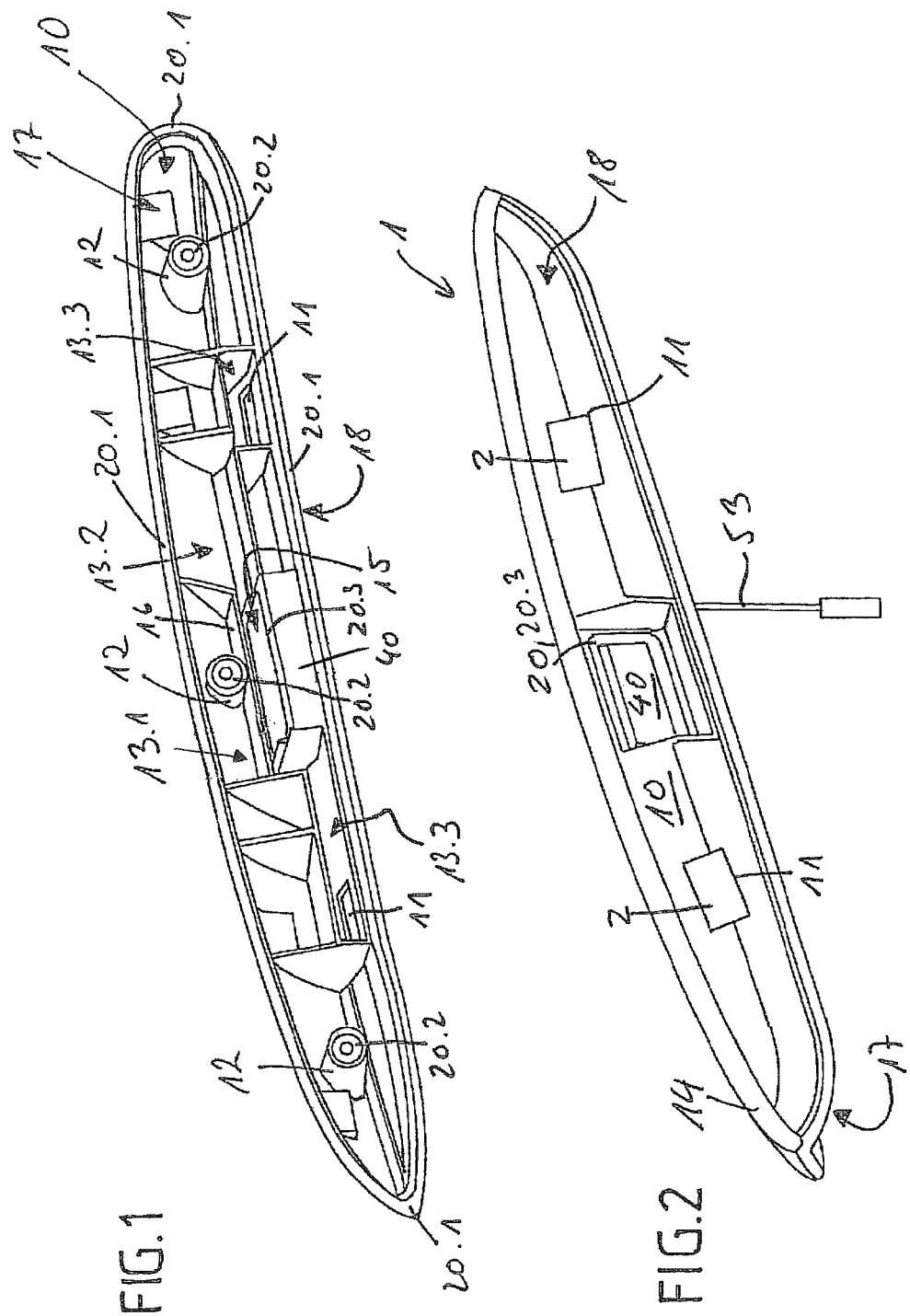

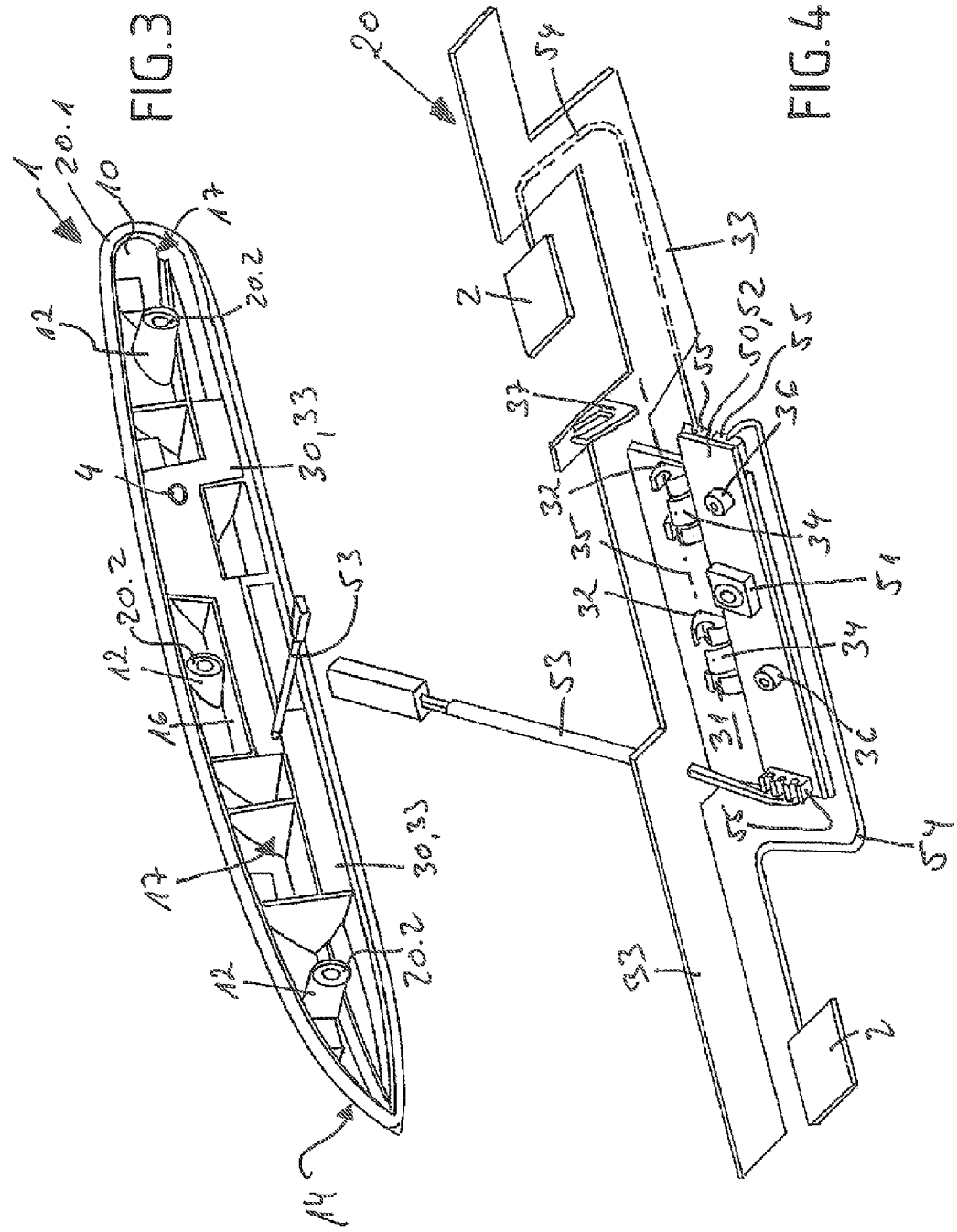

REAR TRIM STRIP FOR A MOTOR VEHICLE, AND A METHOD FOR THE PRODUCTION OF A REAR TRIM STRIP

TECHNICAL FIELD

The invention relates to a rear trim strip for a motor vehicle, having at least one base support and at least one luminous element which is arranged on an opening of the base support in order to achieve an illumination of the external area of the motor vehicle, having an actuating element arranged on the base support by means of which a switch can be actuated, whereby it is possible to achieve an activation of a lock on board the motor vehicle. In addition, the invention relates to a method for the production of a rear trim strip as just described.

BRIEF DISCUSSION OF RELATED ART

An illumination device for the purpose of illuminating the rear license plate of a motor vehicle is described in DE 202 17 640 U1. In this case, the prior art uses an extended support body which carries illuminating lamps and an electromechanical device which is operated manually for the purpose of activating, locking, and/or unlocking the trunk lock, for example. It has proven disadvantageous that the support body described above is costly of time and effort to build, and the requirements are not always met for a reliable seal of the electronics. In addition, the frame of the support body is designed with a complex niche in which the switch is arranged which is activated from the outside. This niche requires a large constructed space, which negatively influences the overall construction of the support body.

BRIEF SUMMARY

The problem addressed by the present invention is that of avoiding the disadvantages named above, and particularly that of providing a rear trim strip for a motor vehicle which includes few individual components and therefore is simple and quick to assemble, wherein at the same time the functionality of the individual components which are arranged on the rear trim strip, such as the actuating element, for example, is ensured.

According to the invention, a lid is attached on the base support, the lid is designed having a board for electronics which projects into the base support, wherein an electronic device having the switch is arranged on the board, and the lid is designed in such a manner that a reliable transmission of force takes place upon the actuation of the actuating element by means of the board for the electronics.

The core of the invention is that at least in sections thereof the electronics board of the lid projects into the base support, whereby a compact overall construction of the rear trim strip is created. The electronics board has the function of reliably holding the electronic device which is electrically connected to the luminous body as well as to the switch, on the one hand. On the other hand, the electronics board provides a support surface in order to reliably receive the force from the actuating element applied from the outside upon an actuation of the actuating element by the user. As such, it is possible to rule out damage to the switch and/or the base support. The electronics board is advantageously disposed on a support wall of the base support, such that the force applied from the actuating element can be directed into the trim strip.

The base support can advantageously be designed as a two-component injection molded part, and/or the base support can have a soft component which runs along the base support in such a manner that it is possible to prevent environmental conditions from penetrating between the base support and the motor vehicle, and/or the resetting of the actuating element is possible, and/or scratch protection is provided for the motor vehicle during the installation of the rear trim strip. As such, the base support can be designed as a 2-component part, wherein the soft component efficaciously functions to seal the electronic device situated inside the base support. The soft component can advantageously be arranged on the side of the base support which faces the motor vehicle, such that a closed contour and/or a closed profile of the soft component is created. As such, it is possible to prevent the penetration of environmental influences, such as moisture, dust, dirt, etc., between the base support and the motor vehicle, and/or the motor vehicle body. In addition, the soft component can serve as a connector and/or as an intermediate element which connects the actuating element and the base support. The base support is designed with a corresponding opening in which the actuating element is inserted. In this case, the soft component can have material properties and/or a geometry which allows the actuating element to reset following its actuation. Moreover, the soft component can be arranged in the region of the luminous body and/or the luminous bodies, such that a reliable seal is realized at this point of the base support via the soft component. As an alternative and/or in addition thereto, the soft component can also be designed in such a manner that contact and/or damage is prevented, on a visible area of the motor vehicle body, during the installation of the rear trim strip on the motor vehicle. This can be realized in that the soft component is designed with a projection which holds the rear trim strip at a distance from the vehicle body. Only the attachment means intended for the attachment of the rear trim strip on the motor vehicle contact the motor vehicle.

In addition, the lid can be sealed on the base support in such a manner that the electronic device is reliably sealed. After the lid has been brought into position on the inside of the base support, a seal is created between the lid and the base support. The seal can be realized via gluing, via a laser welding process, or via an ultrasound welding. Alternative sealing alternatives for attaching the lid on the base support can be contemplated, such as clipping the lid to the base support, for example, wherein corresponding areas of the lid and/or of the base support are preferably given a seal and/or a corresponding soft component for sealing the same. After the lid is sealed on the base support, it is ensured that a space is created for the electronic device having the switch, luminous bodies, and the corresponding wiring, wherein said space is sealed off from the external area without the risk of environmental influences, such as moisture, entering this space.

In one measure which improves the invention, the electronics board can have at least one bearing position for the actuating element. As a result, the electronics board can assume an additional function in the overall conception of the rear trim strip, particularly in that the electronics board provides a bearing option for the movable actuating element, and the latter can be pivoted along an axis on the bearing position upon a corresponding actuation by the user, for example. An activation and/or a contact of the switch located on the electronic device takes place via the actuation of the actuating element. Because the electronic device, with the switch, is reliably sealed off from the outer area, it is not necessary to include casting compound in this area. Because the casting compound according to the prior art generally has a high density, the invention is further characterized in that a lower-weight rear trim strip is created which at the same time ensures a protected electronic device via the sealing lid.

Two bearing positions can be advantageously included on the electronics board, wherein the switch is arranged in the center between both bearing positions. It has been found that a reliable functionality of the actuating element, as well as of the switch, results from this configuration. In addition, the actuating element, the switch, and the mounting of the actuating element can be designed in such a manner that the actuating element provides the user with a tactile feedback on its entire, externally accessible surface upon an activation of the actuating element. It is particularly convenient for the user that he or she receives a tactile feedback at any point on the actuating element.

In addition, it can be contemplated that the electronic device has a circuit board on which the switch is attached, wherein the circuit board particularly has an output line which can be connected to the power supply on board the motor vehicle, as well as a line which leads to the luminous bodies. Advantageously, two luminous bodies are included which serve to illuminate the external area of the motor vehicle, particularly the illumination of the license plate. For example, the luminous bodies can be designed as LED luminous bodies. The use of further types of illumination means can likewise be contemplated. In one possible embodiment of the invention, the output line to the on-board power supply runs through an opening of the lid which is likewise sealed, such that the electronic device is reliably sealed off inside the base support.

The electronics board can advantageously have at least one stop element which is functionally assigned to the actuating element, whereby it is possible to prevent damage to the switch upon an actuation of the actuating element. The stop element can project through the circuit board of the electronic device, for example, wherein at the same time the stop element can serve to fix the circuit board on the electronics board. For example, it can be contemplated that the lid forms a monolithic component, and/or a component which is composed of a single material, together with the bearing position and/or the multiple bearing positions, as well as with at least one stop element. The switch is advantageously located between two stop elements. In this way, the configuration prevents an undesired tipping or malpositioning from occurring during the actuation of the actuating element.

In a further measure of the invention, it can be contemplated that multiple attachment areas are included on the base support which serve to attach the base support on the motor vehicle, wherein particularly each attachment area comprises the soft component. Force-fitting and/or positive-fitting attachment means can be used in the attachment areas in order to create a subsequent attachment of the base support on the motor vehicle body. The soft component serving as the seal is advantageously situated on the free end which is oriented towards the motor vehicle body.

In one possible embodiment of the invention, the base support can form a single assembly component together with the actuating element, wherein the actuating element is secured against loss during the assembly via the soft component which reliably holds the actuating element on the base support. Due to the soft plastic material of the soft component, the actuating element can easily be pivoted in its position in order to have a certain range of movement when the actuating element is attached on the bearing position of the electronics board. The attachment of the actuating element on the bearing position can be realized via a locking connection, for example. In this case, the actuating element can have corresponding locking means on the side which faces toward the motor vehicle body, which are held in lock openings of the bearing position in a locking and movable manner.

In a further embodiment of the invention, it can be contemplated that the base support and/or the lid has an attachment interface for attaching a camera. In this case, the base support and/or the lid can have corresponding receptacles, receptacle cavities, housing molds, etc., which can reliably accommodate, mount, and secure a camera. In this case, the camera can serve as a parking aid. In addition, it can be contemplated that the camera is fixed and attached in an unmovable manner in the rear trim strip. As an alternative, when the camera is activated, the camera can be pivoted from a standby position into an active position via a corresponding movement inside the rear trim strip. An electric motor can be contemplated for this purpose and can provide the corresponding movement of the camera. The motor can be attached inside the rear trim strip, particularly inside or on the base support, for example. Likewise, the motor can be attached on the motor vehicle and a connection can be made between the camera and the electric motor via a drive mechanism.

In addition, it is possible that the base support has cavities which are connected to each other in a labyrinthine manner, and the line runs in the cavities and connects the electronic device to the luminous body. On the one hand, the cavities inside the base support can serve to stabilize and/or to reinforce the entire rear trim strip. In addition, the cavities which are connected to each other serve as stowing space for various electronic components, such as the electronic device, luminous bodies, camera, and switch, wherein it is possible to reliably seal the electronic components via the lid, as well as via the sealing of the lid on the base body.

The circuit board can have connection elements such as connectors which ensure an electrical contact between both the output line and the line to the luminous bodies and the circuit board. In order to design the lines named above in a manner which makes installation thereof on the named connectors easy, it has been shown that a connector having a crimp-and-cut connection is particularly advantageous. The connectors which serve both the output line and the line to the luminous bodies can be designed as IDC connectors.

In addition, it can be contemplated that the lid forms a physical unit together with the electronic device, including the switch and the circuit board, as well as the output line to the on-board power supply and the lines to the luminous bodies, and this physical unit is intended to be attached on the base support. In a further option according to the invention, the luminous bodies can be integrated in addition to this physical unit. As an alternative, it can be contemplated that the luminous bodies are attached in the corresponding openings of the base support before the actual connection of the electronic device to the luminous bodies takes place, said electronic device being situated on the lid.

In a further measure which improves the invention, a panel can be attached externally on the base support, and particularly has an emblem and/or a logo and/or a symbol. The panel can be connected to the outer side of the base support via a positive-fitting and/or force-fitting and/or material connection, wherein a locking connection is advantageous due to the ease of assembly thereof. In addition, the panel can be painted according to the motor vehicle paint. A chrome panel can likewise be contemplated which has a shielding function in order to provide protection to the electronic device arranged inside the rear trim strip.

In addition, it can be contemplated that the lid has at least one arm which closes off the cavities, wherein particularly multiple arms are included which have a labyrinthine profile which is adapted to the geometry of the cavities. Two arms are advantageously included which close off the cavities inside the base support. In one possible embodiment, the electronics board of the lid is situated in the center of the two arms. In addition, the base support has an insertion opening into which the electronics board is inserted, together with the electronic device.

In order to ensure the reliability of the functionality of the actuating element, the base support and/or the lid can have means for compensating pressure. Because the space and/or the cavity in which the switch is arranged is sealed from the outer area, it can be contemplated that pressure variations are created inside the actuating element due to temperature changes, and these could allow an undesired activation of the actuating element. In order to effectively prevent this, means are included for compensating pressure. The means can be designed as a very small opening, for example, which creates a connection to the external area. The opening is advantageously given a membrane. The membrane can be semi-permeable with regard to moisture, for example, meaning that no moisture can penetrate from outside into the interior of the rear trim strip, but a higher pressure inside the rear trim strip can nevertheless be compensated through the membrane.

According to the invention, a method for the production of a rear trim strip for a motor vehicle is provided, said rear trim strip having at least one base support and at least one luminous body which is arranged on an opening of the base support in order to realize an illumination of the external area of the motor vehicle, having an actuating element arranged on the base support by means of which a switch can be actuated, whereby it is possible to activate a lock on the motor vehicle, wherein the method comprises the following steps:

sheathing of the base support and of the actuating element with a soft component, such that the base support and the actuating element then form an assembly unit, attachment of the actuating element on a lid which is designed having an electronics board, wherein the electronics board carries an electronic device having the switch, sealing of the lid on the base support, such that the electronic device is sealed.

It is particularly advantageous that no casting compound having a high mass is necessary, the same providing a reliable seal for the electronic device according to the prior art. In addition to saving weight, it is possible to reduce the complexity of the assembly in the production of the rear trim strip, because the base body forms an assembly unit with the soft component, wherein only the lid, having the electronic device, needs to be attached to said assembly component, and simultaneously provides a seal.

BRIEF DESCRIPTION OF THE DRAWINGS

Additional advantages, features, and details of the invention are found in the following description, wherein possible embodiments of the invention are described in detail with reference to the illustrations. The features mentioned in the claims and in the description can be essential to the invention either individually or in any and all combinations thereof.

FIG. 1 shows a rear view of a rear trim strip according to the invention, having a base support, FIG. 2 shows the rear trim strip according to FIG. 1 in a frontal view, FIG. 3 shows a rear view of the rear trim strip according to FIG. 1, wherein a lid is inserted into the base support of the rear trim strip, FIG. 4 shows a three-dimensional illustration of the lid according to FIG. 3.

DETAILED DESCRIPTION

Figure 5:
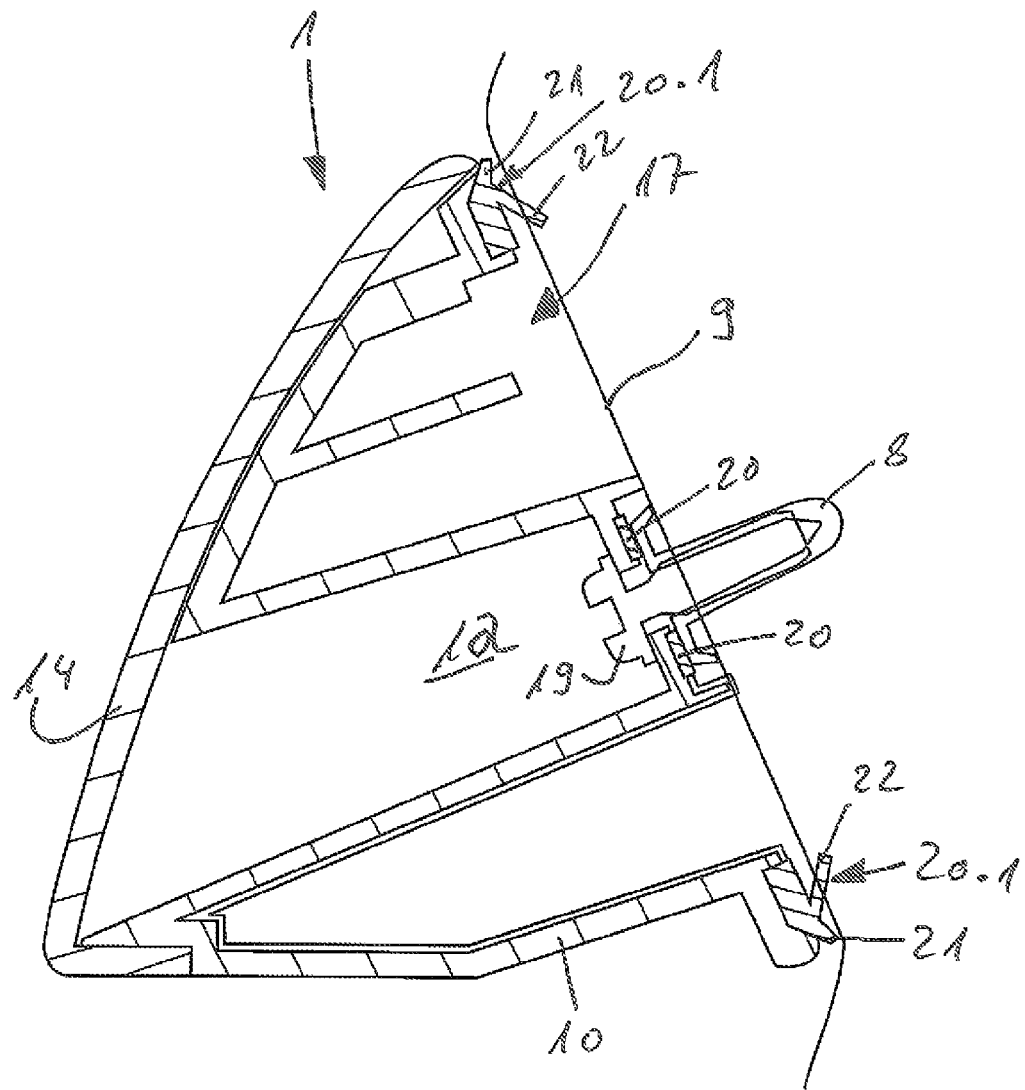
FIG. 5 shows a possible embodiment of a rear trim strip in a cutaway view which schematically illustrates the attachment of the rear trim strip on the motor vehicle body.

FIG. 1 shows a base support 10 of a rear trim strip 1 of a motor vehicle. In this case, the interior view 17 of the base support 10 is shown. FIG. 2 shows the outer side 18 of the base support 10, wherein two luminous bodies 2 are arranged and held in corresponding openings 11 of the base support 10. The luminous bodies 2 serve to illuminate the surroundings, particularly to illuminate the license plate of the motor vehicle. The luminous bodies 2 have LEDs. An actuating element 40 is arranged in the center of the two luminous bodies 2, which the user can activate to unlock a rear hatch lid lock or trunk lock which is not explicitly illustrated. The lock is unlocked when the actuating element 40 is actuated, such that an opening process of the hatch lid or of the trunk of the motor vehicle can be executed.

As is shown in FIG. 1, the base support 10 has three attachment areas 12 through which an attachment means 19 can be guided in order to attach the rear trim strip 1 on the motor vehicle 9 and/or on the motor vehicle body 9, as shown in FIG. 5.

As is clarified in FIG. 1 and FIG. 3, the base support 10 has a plurality of cavities 13.1, 13.2, and 13.3 on its inner side 17 which provide reinforcement of the base support 10. One cavity 13.3 is located in the area of the opening 11 for the luminous body. Moreover, the base support 10 comprises the cavities 13.1 and 13.2, which will be addressed in the following.

A lid 30 is shown in FIG. 3 and FIG. 4 which comprises an electronics board 31. An electronic device 50 is attached on the electronics board 31 and comprises a circuit board 52 on which a switch 51 is located. When the actuating element 40 in FIG. 2 is actuated, a pivot movement of the actuating element 40 occurs about the axis 35 which is formed by the bearing position 32. The actuating element 40 is particularly fixed in the bearing position 32 and capable of rotating when the rear trim strip 1 is in the assembled state. The bearing position in FIG. 4 also has a locking element 34 which engages with the inner side of the actuating element 40, whereby the actuating element 40 is reliably held on the base support 10. At the same time, it is ensured that the actuating element 40 can be pivoted about the axis 35 so that the switch 51 on the circuit board 52 can be activated.

In order to prevent damage to the switch 51, two stop elements 36 are arranged on the electronics board 31 and serve as a limit stop for the inner side of the actuating element 40 if the actuating element 40 is actuated. In the present embodiment, the electronics board 31 forms a monolithic component, together with the stop element 36, which is made of a single material. As can further be seen in FIG. 4, the circuit board 52 has connectors 55 to which an output line 53 to the on-board power supply and a line 54 to each of the luminous bodies 2 are connected. In the present embodiment, the connectors 55 are IDC connectors which have cutting crimps, whereby a reliable connection between the connector 55 and the respective line 53, 54 is possible.

As can particularly be seen in FIG. 3 and FIG. 4, the lid 30 has two arms 33 which extend laterally away from the electronic device 50 proceeding from the electronics board 31. The electronics board 31 constitutes a wall which in the present embodiment is perpendicular to the arms 33. As such, it is possible to ensure that the electronics board 31 can be inserted into the insert 15 shown in FIG. 1, wherein at the same time the arms 33 cover the cavities 13.1, 13.2, 13.3, as shown in FIG. 3. The lines 54 to the luminous bodies 2 each run in one of these cavities 13.1, 13.2, 13.3.

A base support 10 according to FIG. 1 is available during the assembly of the rear trim strip 1, and this [10] has been previously constructed with a soft component 20. The base support 10 and the soft component 20 therefore form a two-component injection molded part. The soft component 20 is arranged at different points of the base support 10. On the one hand, the soft component 20.1 serves to create a seal between the base support 10 and the motor vehicle. In addition, the attachment areas 12 have a soft component 20.2 which likewise has a sealing function. The soft component 20.2 prevents the penetration of environmental influences, such as moisture, dirt, etc., into the base support 10 from the outside through the dome-like attachment area 12.

In addition, the soft component 20.3 serves as an attachment means for the actuating element 40, wherein at the same time the soft component 20.3 enables the actuating element 40 to reset. To this end, the soft component 20.3 is designed with a corresponding geometry, such that after the actuating element 40 is actuated, the soft component 20.3 "automatically" returns the actuating element 40 to the starting position.

In addition, the soft component 20.1 can be designed with an additional projection 21, the same shown in FIG. 5, whereby a separation is ensured between the rear trim strip 1 and the motor vehicle body 9 during the assembly. The projection 21 functions to create a defined separation between the rear trim strip 1 and/or the base support 10 and the body 9 of the motor vehicle, without the risk of a scratch being created on the motor vehicle body during the assembly of the rear trim strip 1 on the motor vehicle 9.

As can further be seen in FIG. 5, the soft component 20.1 has a further projection 22 which effectively prevents environmental influences from being able to penetrate between the base body 10 and the vehicle body 9 from the outside.

The base support 10 having the soft component 20 therefore forms a unified assembly component to which the lid 30 is attached. If the lid 30 is in the position in FIG. 3, it is then necessary to seal the electronics inside, including the electronic device 50, the switch 51, the circuit board 52, the output line 53 to the on-board power supply, the lines 54 to the luminous bodies 2, and the luminous bodies 2. This is realized in that a corresponding seal occurs between the lid 30 and the base support 10, wherein a gluing, laser welding, or ultrasound welding can be contemplated. At this point, it should be noted that the opening 11 on the base support 10, where the luminous body 2 is arranged, can likewise be constructed with the soft component 20.

Furthermore, the lid 30 is designed in such a manner that a reliable transmission of force takes place through the electronics board 31 upon actuation of the actuating element 40. In this case, the inner side of the actuating element 40 contacts the switch 51, wherein the transmission of force takes place through the electronics board 31, and at the same time the force proceeding from the actuating element 40 is relayed further. In this case, the electronics board 31 abuts the support wall 16 of the base support 10 such that the force is reliably directed into the rigid base support 10.

In FIG. 2 and FIG. 5, a panel 14 is shown which is attached on the outer side of the base support 10. The attachment can be a locking connection. The panel 14 can be matched to the color of the motor vehicle body, for example. In addition, it can be contemplated that the panel 14 has an emblem and/or a logo and/or a symbol which is easily visible from the outside. When the rear trim strip 1 is in the assembled state, it is preferably above the motor vehicle license plate. The output line 53 in FIG. 4 runs through an opening of the lid 30 and is connected to the motor vehicle power supply on board the motor vehicle when in the assembled state.

As is shown in FIG. 3, the lid 30 is designed with a means 4 for compensating pressure. The means 4 has an opening with a membrane which functions to prevent the actuating element 40 from being unintentionally activated, for example, when temperatures change. The means 4 has the technical feature that no moisture can penetrate into the cavity 13 from the outside. For example, the means 4 can have an opening which is closed off by a semi-permeable membrane.

Figure 6:
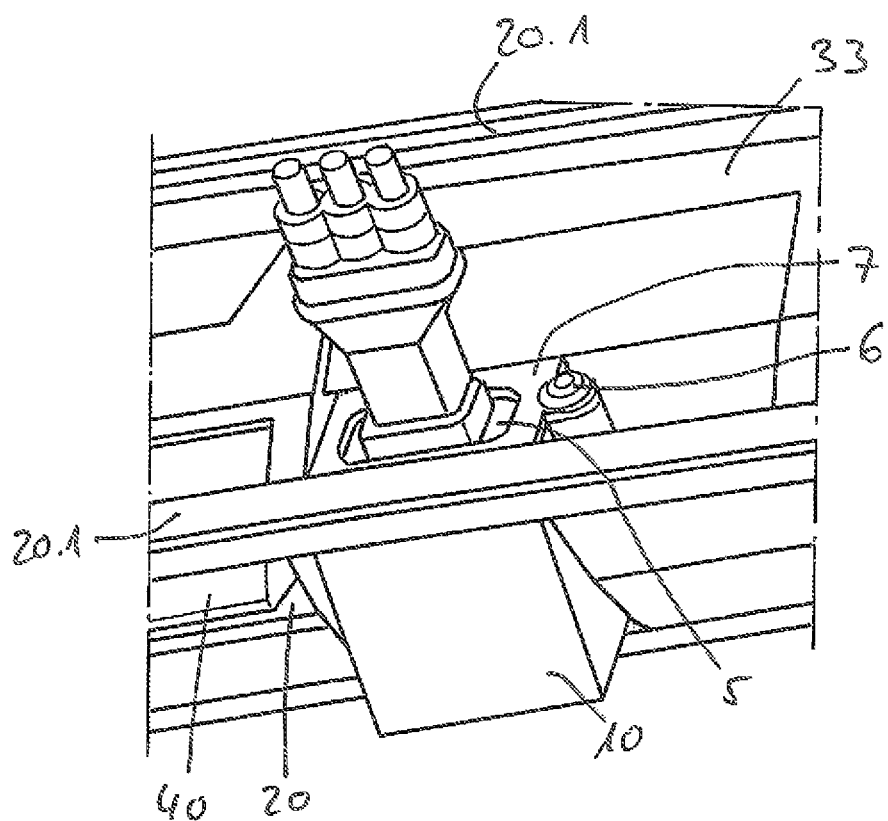
FIG. 6 shows a further embodiment of the rear trim strip, having a camera which can serve as a vehicle environment detector for the motor vehicle driver.
Figure 7:
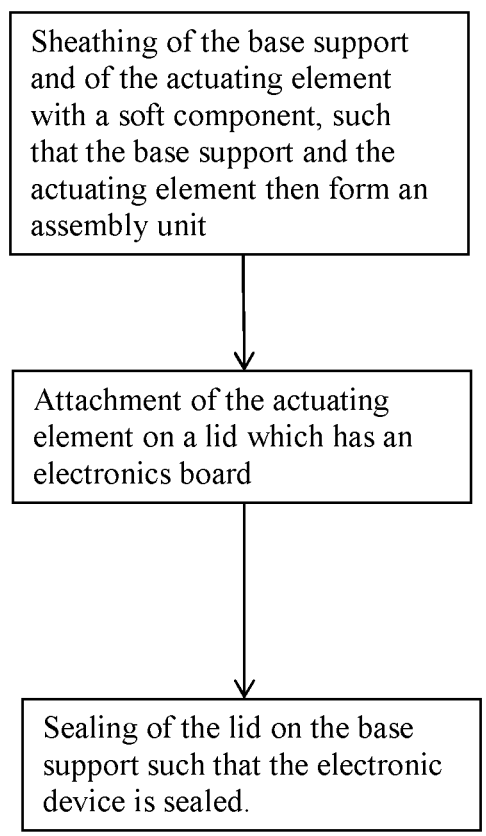
FIG. 7 shows a flow diagram of the method for the production of a rear trim strip for a motor vehicle.

A further embodiment is shown in FIG. 6, wherein a camera 5 can be integrated in the rear trim strip 1, wherein the camera 5 can serve as a parking aid. In the present embodiment, an additional part 7 is included which reliably holds the camera 5 in the base support 10, wherein the additional part 7 is attached on the base support 10 via an attachment means 6—in this case a bolt 6. In order to further augment the attachment of the camera 5, the additional part 7 can further be secured on an attachment means 37 as in FIG. 4.

According to FIG. 5, the attachment of the assembled rear trim strip 1 on the motor vehicle is realized in such a manner that the dome-like attachment areas 12 guide an attachment means 19—in this case a bolt 19. The motor vehicle body 9 has perforations at the defined points where a mounting clip 8 is attached. A seal is situated between the mounting clip 8 and the base support 10, and can be the soft component 20 which has been previously molded onto the base support 10. After the bolt 17 has been bolted onto the motor vehicle body 9, the panel 14 can be stuck onto the base support 10.

One of the special features of the rear trim strip 1 described above is that the actuating element 40 is already reliably held on the base support 10 via the soft component 20 before the lid 30 is attached on the base support 10. The actuating element 40 is therefore held on the base support 10 in a manner preventing the loss thereof. If the lid 30 is brought into proximity in a following assembly step to the inner side 17 of the base support 10, the attachment of the actuating element 40 to the bearing position 32 takes place via a locking connection. After the sealing of the lid 30 on the base support 10 is complete, and the luminous bodies 2 and/or the camera 5 have already been installed on the base support 10, the rear trim strip 1 is fixed in its entirety on the motor vehicle body 9 via the attachment area 12, as described above.

The invention claimed is:

1. A rear trim strip for a motor vehicle, the rear trim strip comprising:
   at least one base support and at least one luminous body which is arranged on an opening of the base support to illuminate an outer area of the motor vehicle,
   an actuating element arranged on the base support and adapted to actuate a switch to activate a lock on the motor vehicle, wherein
   a lid is attached on the base support, the lid comprises an electronics board, wherein the electronics board projects into the base support and comprises at least one bearing element for the actuating element, the actuating element being rotatably locked to the bearing element via a locking element, and an electronic device having the switch is arranged on the electronics board, and
   the lid is designed in such a manner that a transmission of force through the electronics board takes place upon an actuation of the actuating element, and
   wherein the base support is a two-component injection molded part, and the base support has a soft component which runs along the base support, wherein the soft component is configured to prevent the entrance of environmental influences between the base support and the motor vehicle,
   wherein the soft component is arranged on the side of the base support which faces the motor vehicle, such that at least a closed contour or a closed profile of the soft component is created, and the soft component is in contact with the vehicle body, and
   wherein the switch is located between a first stop element and a second stop element, the first stop element and the second stop element are arranged on the electronics board.

2. A rear trim strip according to claim 1, wherein the lid is sealed on the base support in such a manner that the electronic device is sealed.

3. A rear trim strip according to claim 1, wherein the electronics board has an output line which is connected to a motor vehicle on-board power supply, and a line which leads to the luminous body.

4. A rear trim strip according to claim 1, wherein the first stop element and the second stop element are configured to prevent damage to the switch when the actuating element is actuated.

5. A rear trim strip according to claim 1, wherein the actuating element is configured to provide the user with tactile feedback along an entire surface of the actuating element accessible from an exterior of the rear trim strip.

6. A rear trim strip according to claim 1, wherein multiple attachment areas are included on the base support which serve to attach the base support to the motor vehicle, wherein each attachment area comprises a soft component.

7. A rear trim strip according to claim 1, wherein the base support and/or the lid has an attachment interface for the attachment of a camera.

8. A rear trim strip according to claim 1, wherein the base support has cavities which are connected to each other, and a line runs in the cavities and connects the electronic device to the luminous body.

9. A rear trim strip according to claim 1, wherein an outer surface of the base support is configured to be attached to a panel of the motor vehicle.

10. A rear trim strip according to claim 1, wherein the lid has at least one arm which closes off cavities.

11. A method for the production of a rear trim strip for a motor vehicle, the rear trim strip having:
   at least one base support and at least one luminous body which is arranged on an opening of the base support to illuminate an outer area of the motor vehicle, an actuating element arranged on the base support and adapted to actuate a switch to activate a lock on the motor vehicle,
   the method having the following steps:
   a) sheathing of the base support and of the actuating element with a soft component, such that the base support and the actuating element form an assembly unit,
   b) attachment of the actuating element on a lid having an electronics board, wherein the electronics board comprises at least one bearing element for the actuating element, the actuating element being rotatably locked to the bearing element via a locking element, and wherein the electronics board carries an electronic device having the switch, and wherein the switch is located between a first stop element and a second stop element, the first stop element and the second stop element are arranged on the electronics board,
   c) sealing of the lid on the base support, such that the electronic device is sealed,
   wherein the base support is a two-component injection molded part, and the base support has a soft component which runs along the base support, wherein the soft component is configured to prevent the entrance of environmental influences between the base support and the motor vehicle, and
   wherein the soft component is arranged on the side of the base support which faces the motor vehicle, such that at least a closed contour or a closed profile of the soft component is created.

12. A rear trim strip for a motor vehicle, the rear trim strip comprising: at least one base support and at least one luminous body which is arranged on an opening of the base support to illuminate an outer area of the motor vehicle, an actuating element arranged on the base support and adapted to actuate a switch to activate a lock on the motor vehicle, wherein
   a lid is attached on the base support, the lid comprises an electronics board which projects into the base support,
   wherein the electronics board comprises at least one bearing element for the actuating element, the actuating element being rotatably locked to the bearing element via a locking element, wherein an electronic device having the switch is arranged on the electronics board, and
   the lid is designed in such a manner that a transmission of force through the electronics board takes place upon an actuation of the actuating element, and
   wherein
   the base support is a two-component injection molded part, and the base support has a soft component which runs along the base support, wherein the soft component is configured to prevent the entrance of environmental influences between the base support and the motor vehicle, and
   wherein the soft component is arranged on the side of the base support which faces the motor vehicle, such that at least a closed contour or a closed profile of the soft component is created, and the soft component is in contact with the vehicle body,
   wherein the bearing element of the electronics board comprises a first bearing element and a second bearing element configured to fix the actuating element, and wherein each of the bearing elements comprises a locking element which engages the inner side of the actuating element.

13. A rear trim strip according to claim 6, wherein each attachment area comprises a soft component.

* * * * *